Figure 5:
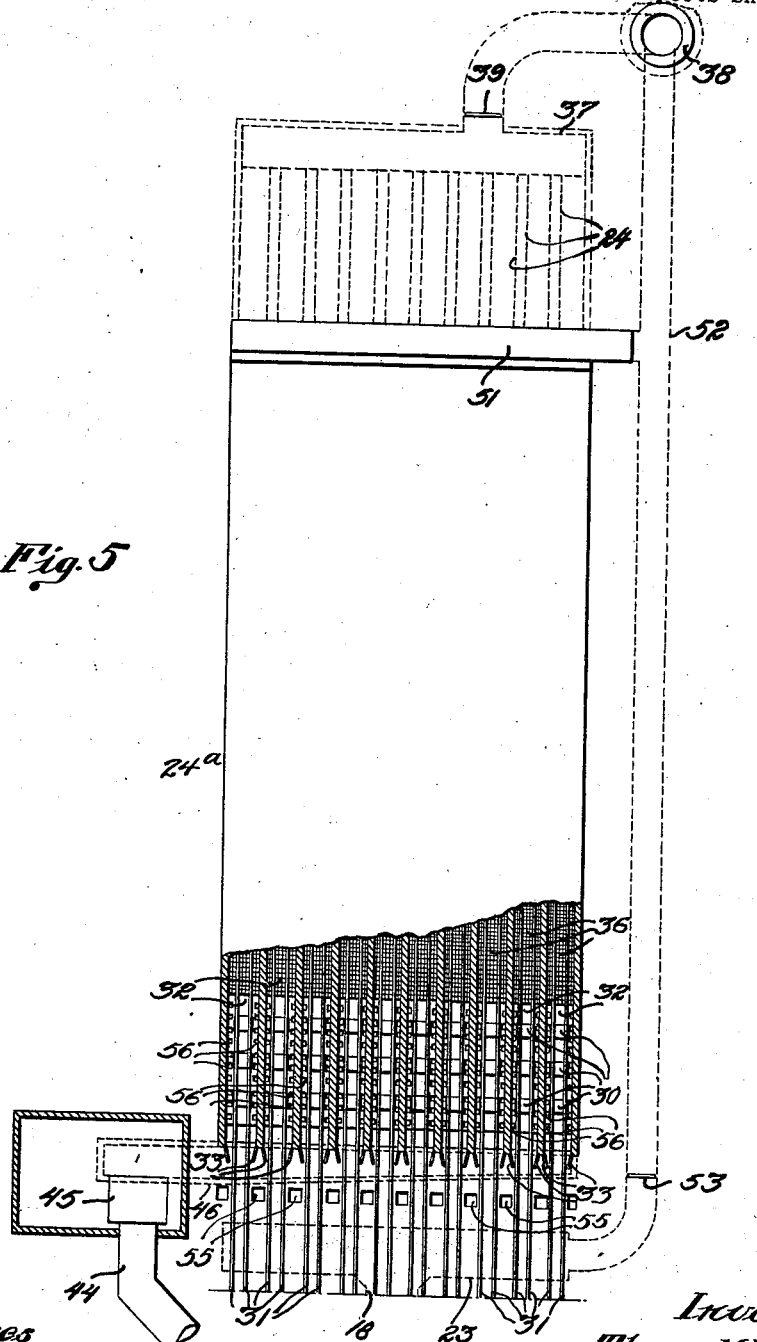

May 1, 1923.
T. M. WILSON
1,453,819
COMBINATION APPARATUS FOR DRYING, BURNING, AND COOLING BRICK
Filed Feb. 7, 1921   5 Sheets-Sheet 1
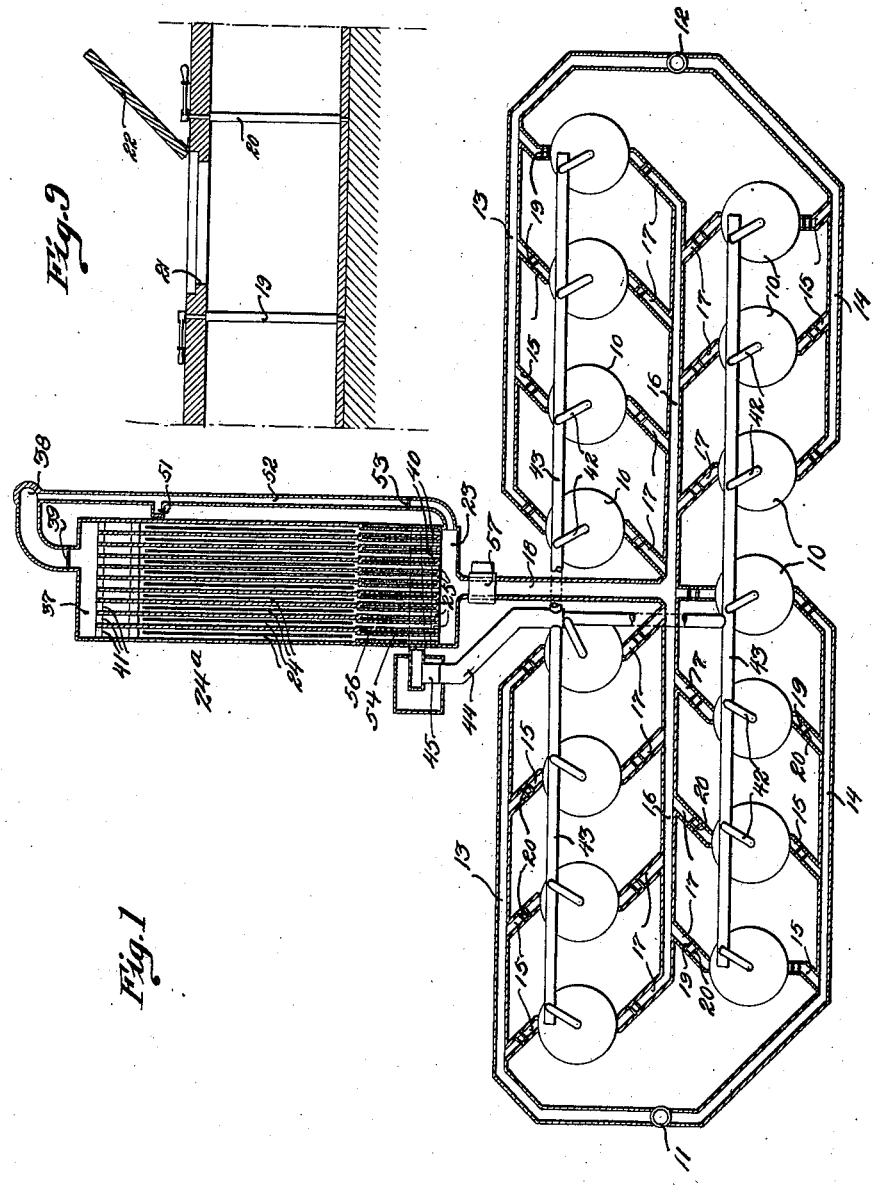

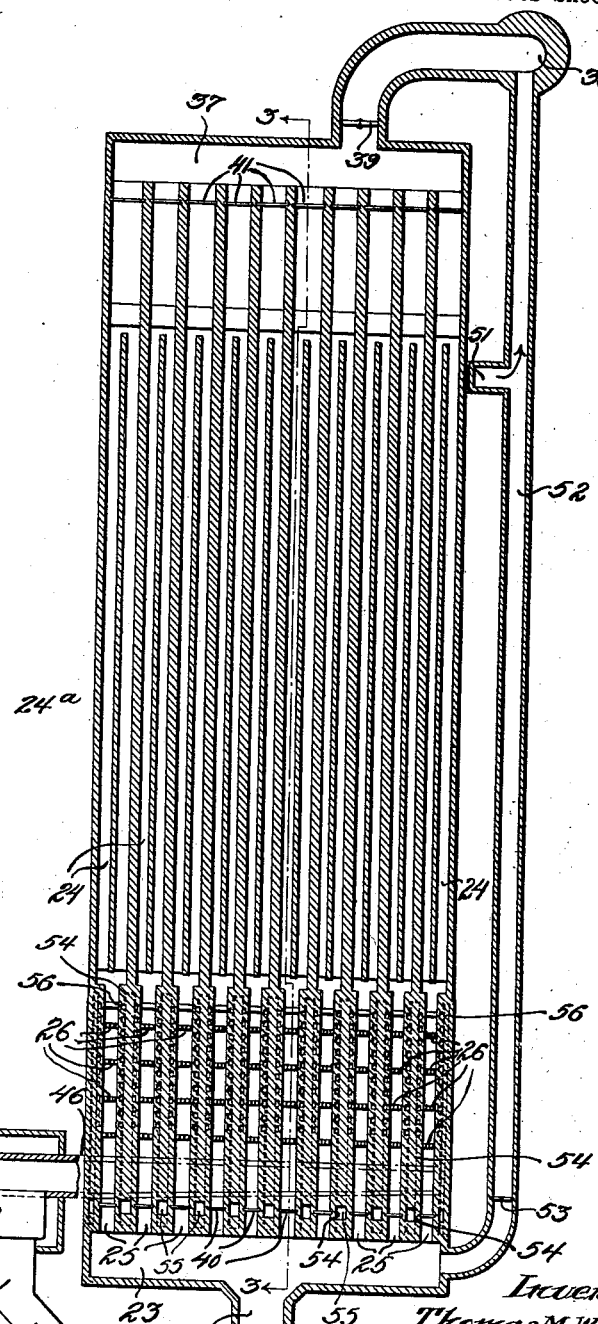

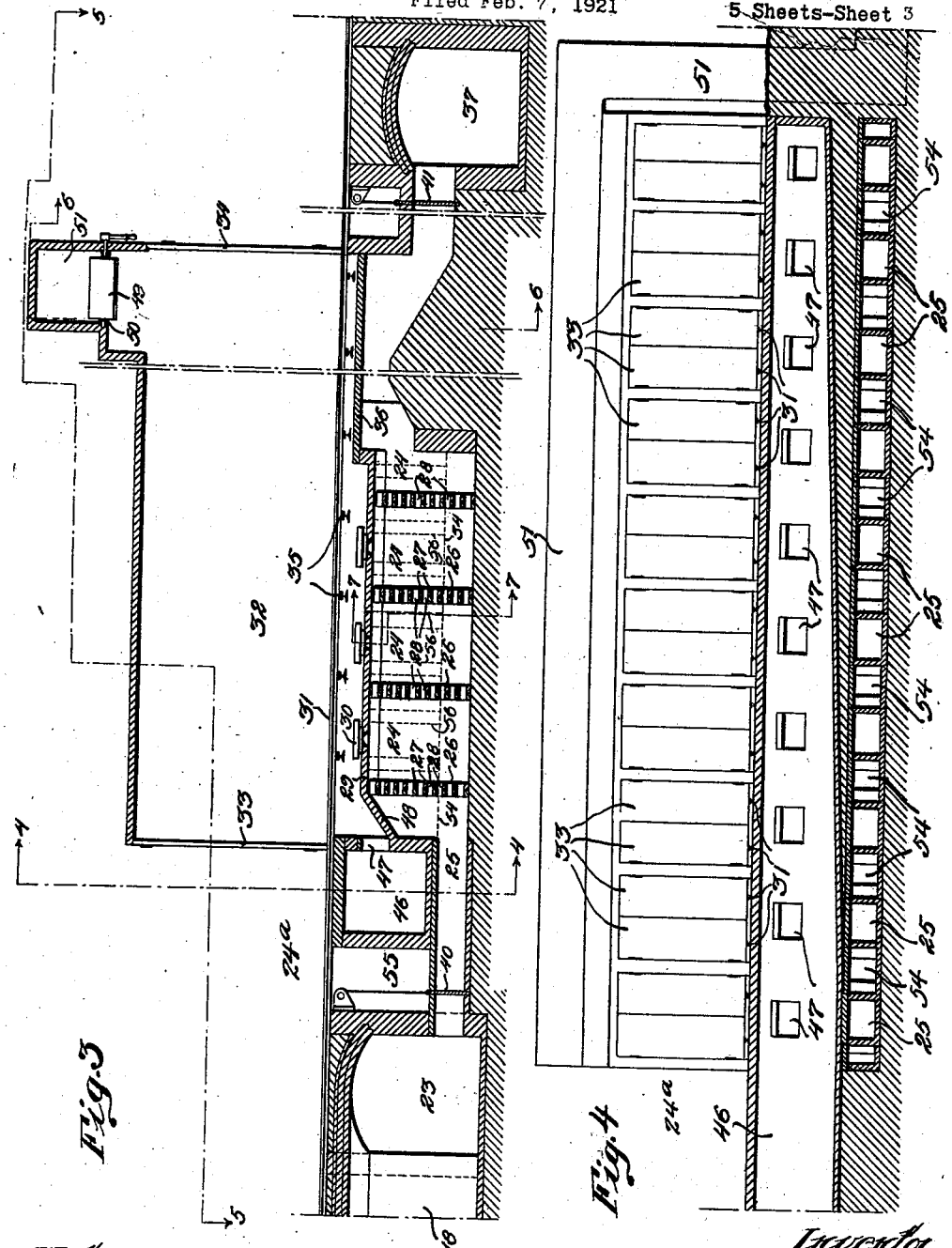

May 1, 1923.

T. M. WILSON 1,453,819

COMBINATION APPARATUS FOR DRYING, BURNING, AND COOLING BRICK

Filed Feb. 7, 1921   5 Sheets-Sheet 4

Witnesses
Geo. A. Gruss
Augustus B. Coppes

Inventor
Thomas M. Wilson
By Joshua R. H. Potts
his Attorney

May 1, 1923.
T. M. WILSON
1,453,819
COMBINATION APPARATUS FOR DRYING, BURNING, AND COOLING BRICK
Filed Feb. 7, 1921
5 Sheets-Sheet 5
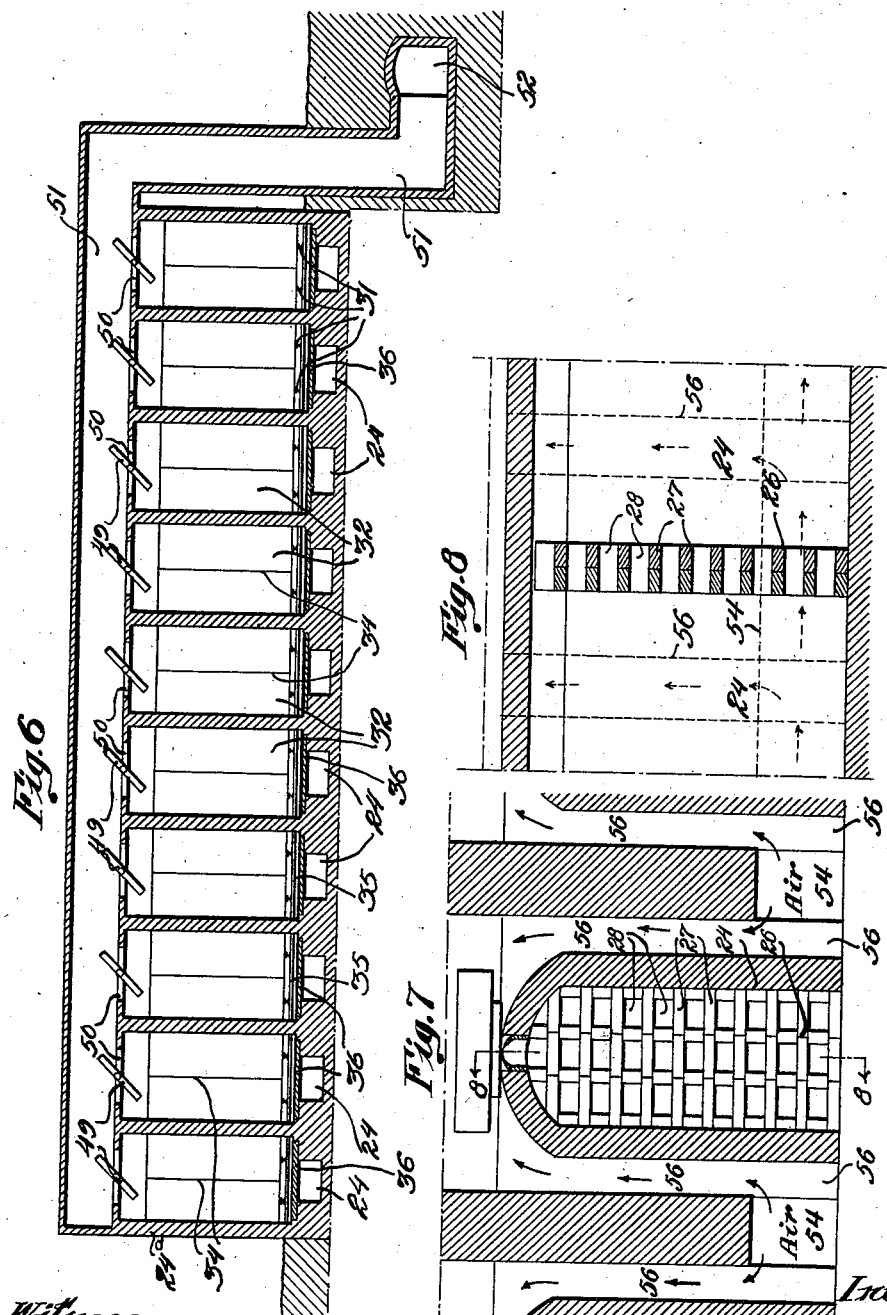

Patented May 1, 1923.

1,453,819

UNITED STATES PATENT OFFICE.

THOMAS M. WILSON, OF GREENSBURG, PENNSYLVANIA.

COMBINATION APPARATUS FOR DRYING, BURNING, AND COOLING BRICK.

Application filed February 7, 1921. Serial No. 442,948.

*To all whom it may concern:*

Be it known that I, THOMAS M. WILSON, a citizen of the United States, residing at Greensburg, in the county of Westmoreland and State of Pennsylvania, have invented certain new and useful Improvements in Combination Apparatus for Drying, Burning, and Cooling Brick, of which the following is a specification.

One object of my present invention is to provide an improved apparatus which can be economically used for drying, burning and cooling brick so as to facilitate the work and reduce labor and cost of operation.

Another object of my invention is to provide improved means which will do away with the necessity of individual firing of the drier and which will utilize the waste heat from the kilns to effectively heat the drier proper and also heat by induction air which is admitted into the drier from the atmosphere so that the heated air will directly heat and quickly and thoroughly dry the bricks.

A further object is to so arrange and construct my improved structure that a plurality or battery of kilns can be employed which can be collectively used for delivery of direct and radiated waste heat for the purpose of pre-heating the brick respectively by induced and direct application.

A still further object is to provide a novel construction of passages for the waste heat from the kilns so as to facilitate the drying of the bricks and insure the maximum use of the waste heat from the kilns.

These objects, and other advantageous ends which will be described hereinafter, I attain in the following manner, reference being had to the accompanying drawings in which—

Figure 1 is a sectional plan view of my improved apparatus showing the kilns and the take-off pipes for the radiated heat in outside view, Figure 2 is an enlarged sectional view of the drier forming a part of my improved apparatus together with the means providing the passage leads for the direct and radiated heat thereto, the section being taken at a slightly higher level than the section of the drier shown in Figure 1, Figure 3 is a fragmentary section taken on the line 3—3 of Figure 2, Figure 4 is a transverse sectional elevation taken on the line 4—4 of Figure 3, Figure 5 is a sectional plan view taken on the line 5—5 of Figure 3, Figure 6 is a transverse section taken on the line 6—6 of Figure 3, Figure 7 is a fragmentary section of one of the sub-tunnels of the drier taken on the line 7—7 of Figure 3 illustrating the baffle structure of my present invention for the hot products of combustion after passing from the kilns for the purpose of heating the brick in the drier by induced heat, Figure 8 is a fragmentary sectional elevation taken on the line 8—8 of Figure 7, and Figure 9 is an enlarged fragmentary section showing an improved shutter and conduit construction for the hot products of combustion capable of emanating from the kilns either during the initial firing of the kilns or during the time in which the products of combustion from the kilns pass to the preliminary drier.

Referring to the drawings, a battery of kilns 10 which may be of any desirable construction is arranged as shown in Figure 1 in rows; two rows being illustrated and being shown diagrammatically. Two stacks 11 and 12 are arranged adjacent opposite ends of the rows of kilns and conduits 13 and 14. which may be located underground, flank the rows of kilns and have branches 15 which lead outwardly from respective kilns and are capable of conducting the products of combustion during firing of the kilns to the respective stacks 11 and 12. The conduits 13 and 14 are positioned in pairs; one pair serving to conduct the products of combustion from kilns nearest the stack 11, while the other pair of conduits serves to conduct the products of combustion from kilns adjacent the stack 12. In other words, each stack serves to conduct the products of combustion from kilns in both rows as clearly illustrated in Figure 1.

A central or medium conduit 16 which also may be located underground has branches 17 leading from the kilns and between its ends communicates with the central angularly disposed tunnel conduit 18. Each of the branches 15 and 17 is provided with a double shutter or damper construction shown in detail in Figure 9. For example each branch has two shutters 19 and 20 which are spaced apart; the conduit between the shutters having an opening 21 which may be closed by a gate or door 22. When the gate is open, air is permitted to enter the conduit between the shutters 19 and 20 and serves as a cooling medium to prevent burning out of the shutters in case any of the kilns are cut off while others of the kilns are being fired, as will be more fully described hereinafter.

The tunnel conduit 18 leads to a transverse tunnel 23 at one end of a drier 24ᵃ. This transverse tunnel 23 adjacent its bottom communicates with a number of longitudinally extending sub-tunnels 24 through the medium of flues 25, as clearly shown in Figures 2 and 3. The sub-tunnels 24 have partitions 26 spaced apart within their lengths as shown in Figures 3, 7 and 8; said partitions being made up of baffle blocks 27 providing apertures 28. The top or cover 29 of the sub-tunnels 24 has radiators 30 directly under tracks 31 in respective superimposed car tunnels 32. The tunnels 32 have doors 33 and 34 at their opposite ends so that cars having bricks to be dried can be run in the tunnels 32 on the tracks 31 after which the doors 33 and 34 can be closed. The tracks 31 are supported on transverse ties 35 so that the induced heat from the radiators 30 can pass upwardly to heat the bricks on the cars; it being noted that the radiators 30 preferably have no apertures but merely heat the tunnels by induced heat absorbed from the hot products of combustion within the tunnels 24 as will hereinafter be more fully described.

The cover 29 has a tile section 36 which becomes heated by the hot products of combustion after the latter has passed through the openings in the partitions 26. A rear transverse tunnel 37 is adapted to receive the products of combustion after passing through the sub-tunnels and this rear transverse tunnel 37 communicates with a stack 38; there being a regulator 39 interposed between the tunnel 37 and the stack 38 as shown in Figure 2. Dampers 40 and 41 are located in the flues 25 and in the rear portions of the sub-tunnels 24 for regulating the amount of heat gases passing therethrough and if desired these dampers may be automatically controlled by thermo-acting mechanism (not illustrated) or they can be operated by mechanical means of any description.

The operation of the apparatus so far described is as follows:—Considering that bricks to be heated are located on cars in the tunnels 32 of the drier and that bricks previously dried are located within the kilns 10, the shutters in the branches 17 are closed and the shutters in the branches 15 are open. The kilns are fired and the hot products of combustion together with moisture from the bricks in the kilns pass through the branches 15 into the conduits 13 and 14 and thence to the stacks 11 and 12. After the temperature within the kilns has reached a heat, such for example approximately 700° F., to drive all the moisture from the bricks, the shutters 19 and 20 in the branches 15 are closed and the shutters in the branches 17 are opened. During the continued firing of the bricks in the kilns the hot gases and products of combustion will pass through the branches 17 into the center conduit 16 and thence through the tunnel conduit 18 into the transverse tunnel 23. This transverse tunnel 23 serves as a distributing header and the products of combustion will pass through the flues 25 into the sub-tunnels 24 where they will be intercepted by the perforated partitions 26 and slightly retarded causing them to give off their heat to the radiators 30 which become hot and transmit heat by induction into the bottoms of the car tunnels 32. A great portion of this heat also is transmitted through the medium of the tile 36 and the products of combustion finally pass into the stack 38 through the medium of the rear transverse tunnel 37. After the bricks within the kilns have been sufficiently fired the shutters in the branches 17 are shut and branch pipes 42 are inserted into the kilns preferably at their tops as shown in Figure 1; said branch pipes leading into the suction pipes 43 which communicate with a main suction pipe 44. This suction pipe 44 leads to a suction fan 45 which draws the hot radiated air from the kilns and delivers it into a secondary transverse tunnel 46 which is formed by a structure over the flues 25 as clearly shown in Figures 3 and 4. The secondary tunnel 46 tapers both in the direction of its width and height and has a number of ports 47 which respectively communicate with the forward portions of the car tunnels 32 below the tracks 31; the cover 29 slanting downwardly as shown at 48 so as to serve as a deflecting baffle for the radiated hot air which passes directly from the tunnel 46 into the car tunnels 32 and serves to finish the drying of the bricks. Furthermore it will be noted that this suction of hot air from the kilns serves to expedite the cooling of the kilns so as to permit quick access thereto for the purpose of removing the finished brick and re-charging the kilns.

It is to be understood that after the brick, as loaded upon the cars, are dried or preliminarily heated in the drier 24ᵃ, they are transferred in the cars or otherwise, as is common in the art, to the kilns 10 to finish driving all of the moisture from the bricks.

The tops of the car tunnels 32 adjacent their rear ends, as clearly shown in Figures 3 and 6, have shutters 49 within openings 50 so that when the shutters 49 are open the steam, air and moisture can pass into an overhead duct 51 which leads to a by-pass 52; said by-pass communicating with the transverse tunnel 23 and with the stack 38. This by-pass 52 has a shutter 53 which can be opened if any of the sub-tunnels 24 or car tunnels 32 are closed so as not to check the passage of air and products of combustion through the drier.

The wall structure of the drier has air flues 54 which enter from the atmosphere from the space 55 forward of the transverse tunnel 23; said air flues communicating with upwardly extending branch passages 56 at opposite sides of the sub-tunnels 24 through which pass the products of combustion from the kilns after said products pass through the flues 25 These upwardly extending branch air passages 56 communicate at their tops with the car tunnels in which the bricks to be dried are positioned. The air in passing through the flues 54 and branch passages 56 becomes heated by induction through the walls from the heat of the hot products of combustion while passing through the sub-tunnels 24. By arranging the baffle partitions 26 within the sub-tunnels 24, the hot products of combustion passing therethrough are slightly retarded so as to effectively give off their heat to the walls; said heat being conducted to heat the air which passes upwardly through the branches 56 into the car tunnels 32 where the hot air serves to heat and dry the bricks.

By providing the shutters 19 and 20, if it is necessary to cut off any one of the kilns while others are still being fired, the shutters of the kiln cut off can be closed and the door 22 opened between the closed shutters. Thus the inner surfaces of the shutters will be kept cool and any heat of the conduits or of the kiln will not burn out the shutters since they will be cooled on their adjacent opposed surfaces as is obvious from the construction shown.

If desired a test kiln or booster can be interposed in the tunnel conduit 18 as indicated at 57 in Figure 1.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. Apparatus of the character described including a drier; a kiln, said drier having tunnels for bricks to be dried and sub-tunnels; means for directing products of combustion from said kiln into said sub-tunnels; and means for conducting radiated heated air from said kiln directly into said first tunnels of the drier, substantially as described.

2. Apparatus of the character described including a drier; a kiln, said drier having tunnels for bricks to be dried and sub-tunnels; means for directing products of combustion from said kiln into said sub-tunnels; and means for sucking radiated heated air from said kiln and delivering it into said first tunnels; substantially as described.

3. Apparatus of the character described including a plurality of kilns; and a conduit having branches respectively communicating with said kilns for taking off the products of combustion, said branches having double shutters therein spaced apart and an opening in the wall of the conduit between said shutters and provided with a closure; substantially as described.

4. Apparatus of the character described including a plurality of kilns; a conduit having branches respectively communicating with said kilns for taking off the products of combustion, said branches having double shutters therein spaced apart; and means providing an opening in the top walls of each of said branches to admit air between said shutters when the latter are closed; substantially as described.

5. Apparatus of the character described including a plurality of kilns; a stack; a conduit communicating with said stack and having branches leading respectively to said kilns for the purpose of conducting the products of combustion therefrom; a second conduit having branches respectively communicating with said kilns to conduct products of combustion therefrom; a drier having tunnels communicating with said second conduit; shutters for selectively cutting off said branches whereby the products of combustion from said kilns can pass either to said stack or to said tunnels, said drier having tunnels above said first tunnels into which the bricks to be dried are placed; an over-head duct leading from the second tunnel; and a by-pass leading from the forward end of the drier to the stack and communicating with said over-head duct; substantially as described.

6. Apparatus of the character described including a plurality of kilns; a stack; a conduit communicating with said stack and having branches leading respectively to said kilns for the purpose of conducting the products of combustion therefrom; a second conduit having branches respectively communicating with said kilns to conduct products of combustion therefrom; a drier having tunnels communicating with said second conduit; shutters for selectively cutting off said branches whereby the products of combustion from said kilns can pass either to said stack or to said tunnels, said drier having tunnels above said first tunnels in which bricks to be dried are placed whereby induced heat from said first tunnels serves to dry the brick in said second tunnels; and means for conducting radiated heated air from said kilns into said second mentioned tunnels when said shutters are closed whereby the radiated heat will directly engage the brick; substantially as described.

7. Apparatus of the character described including a plurality of kilns; a stack; a conduit communicating with said stack and having branches leading respectively to said kilns for the purpose of conducting the products of combustion therefrom; a second conduit having branches respectively communicating with said kilns to conduct products of combustion therefrom; a drier having tunnels communicating with said second conduit; shutters for selectively cutting off said branches whereby the products of combustion from said kilns can pass either to said stack or to said tunnels, said drier having tunnels above said first tunnels in which bricks to be dried are placed whereby induced heat from said first tunnels serves to dry the brick in said second tunnels; means for conducting radiated heated air from said kilns into said second mentioned tunnels when said shutters are closed whereby the radiated heat will directly engage the brick; means providing a by-pass communicating with said first tunnels; a shutter for cutting off the by-pass; and means for cutting off any of said first tunnels; substantially as described.

8. Apparatus of the character described including a plurality of kilns; a stack; a conduit communicating with said stack and having branches leading respectively to said kilns for the purpose of conducting the products of combustion therefrom; a second conduit having branches respectively communicating with said kilns to conduct products of combustion therefrom; a drier having tunnels communicating with said second conduit; shutters for selectively cutting off said branches whereby the products of combustion from said kilns can pass either to said stack or to said tunnels, said drier having tunnels above said first tunnels in which bricks to be dried are placed whereby conducted heat from said first tunnels serves to dry the brick in said second tunnels; partitions spaced apart within said first tunnels and having apertures therein; and radiators communicating with the spaces between said partitions whereby the heat therefrom will be induced indirectly through the medium of the radiators into said second mentioned tunnels; substantially as described.

9. Apparatus of the character described including a plurality of kilns; a stack; a conduit communicating with said stack and having branches leading respectively to said kilns for the purpose of conducting the products of combustion therefrom; a second conduit having branches respectively communicating with said kilns to conduct products of combustion therefrom; a drier having tunnels communicating with said second conduit; shutters for selectively cutting off said branches whereby the products of combustion from said kilns can pass either to said stack or to said tunnels, said drier having tunnels above said first tunnels in which bricks to be dried are placed whereby conducted heat from said first tunnels serves to dry the brick in said second tunnels; a duct communicating with and traversing said second named tunnels; means for controlling communication between said second named tunnels and said duct; a by-pass leading from the forward end of the drier to said stack and with which said duct communicates; and means in said by-pass for opening or closing the same; substantially as described.

10. Apparatus of the character described including a plurality of kilns; a stack; a conduit communicating with said stack and having branches leading respectively to said kilns for the purpose of conducting the products of combustion therefrom; a second conduit having branches respectively communicating with said kilns to conduct products of combustion therefrom; a drier having tunnels communicating with said second conduit; shutters for selectively cutting off said branches whereby the products of combustion from said kilns can pass either to said stack or to said tunnels, said drier having tunnels above said first tunnels in which bricks to be dried are placed whereby conducted heat from said first tunnels serves to dry the brick in said second tunnels; means for conducting radiated heated air from said kilns into said second mentioned tunnels when said shutters are closed whereby the radiated heat will directly engage the brick; means providing a by-pass communicating with said first tunnels; and means providing a take-off duct communicating with said second mentioned tunnels; substantially as described.

11. Apparatus of the character described including a drier having sub-tunnels and other tunnels above said sub-tunnels adapted to receive brick to be dried; means for conducting hot products of combustion to said sub-tunnels; means for conducting the heat from the products of combustion by induction into said second mentioned tunnels; means for conducting heated air directly into said second mentioned tunnels; and a common stack into which the products of combustion from said first tunnels and the air from said second mentioned tunnels pass; substantially as described.

12. The combination of a drier; a kiln; and means for conducting the hot products of combustion from the kiln to the drier, said drier having tunnels therein separated by walls from air passages and through which said products of combustion pass, said air passages communicating with a space in which the bricks to be dried are placed, said products of combustion serving to heat said air in the air passages through the medium of the wall therebetween; substantially as described.

13. The combination of a drier; a kiln; means for conducting the hot products of combustion from the kiln to the drier, said drier having tunnels therein separated by walls from air passages and through which said products of combustion pass, said air passages communicating with a space in which the bricks to be dried are placed, said products of combustion serving to heat said air in the air passages through the medium of the wall therebetween; and means in said drier tunnels for retarding the passage of the products of combustion therethrough so that the latter will effectively give off their heat to heat the air in said air passages and deliver it into said space so as to dry the bricks; substantially as described.

14. The combination of a drier; a kiln; means for conducting the hot products of combustion from the kiln to the drier, said drier having tunnels therein separated by walls from air passages and through which said products of combustion pass, said air passages communicating with a space in which the bricks to be dried are placed, said products of combustion serving to heat said air in the air passages through the medium of the wall therebetween; and partition baffles within said tunnels operative for retarding the passage of the products of combustion therethrough so that the latter will effectively give off their heat to heat the air in said air passages and deliver it into said space so as to dry the bricks; substantially as described.

15. Apparatus for drying, burning and cooling brick including a plurality of kilns; a stack; a conduit communicating with said stack and having branches leading respectively to said kiln for the purpose of conducting the products of combustion therefrom; a second conduit having branches respectively communicating with said kiln to conduct products of combustion therefrom; a drier having tunnels communicating with said second conduit; means for cutting off said branches to cause the products of combustion to pass either to said stack or to said tunnels, said drier having other tunnels receiving the heated air from the first named tunnels; means for conducting the heated air from the kilns into the second named tunnels; independent means for supplying heated air to said second named tunnels; and means for discharging the heated air from the second named tunnel to the stack; substantially as described.

In testimony whereof I have signed my name to this specification in the presence of two subscribing witnesses.

THOMAS M. WILSON.

Witnesses:
AUGUSTUS B. COPPES,
CHAS. E. POTTS.